Aug. 11, 1953     L. E. LURA     2,648,229
POWER TRANSMITTING MECHANISM

Filed April 19, 1951     7 Sheets-Sheet 1

*INVENTOR.*
*LOREN E. LURA*
BY
*ATTORNEY*

Aug. 11, 1953  L. E. LURA  2,648,229
POWER TRANSMITTING MECHANISM
Filed April 19, 1951  7 Sheets-Sheet 3
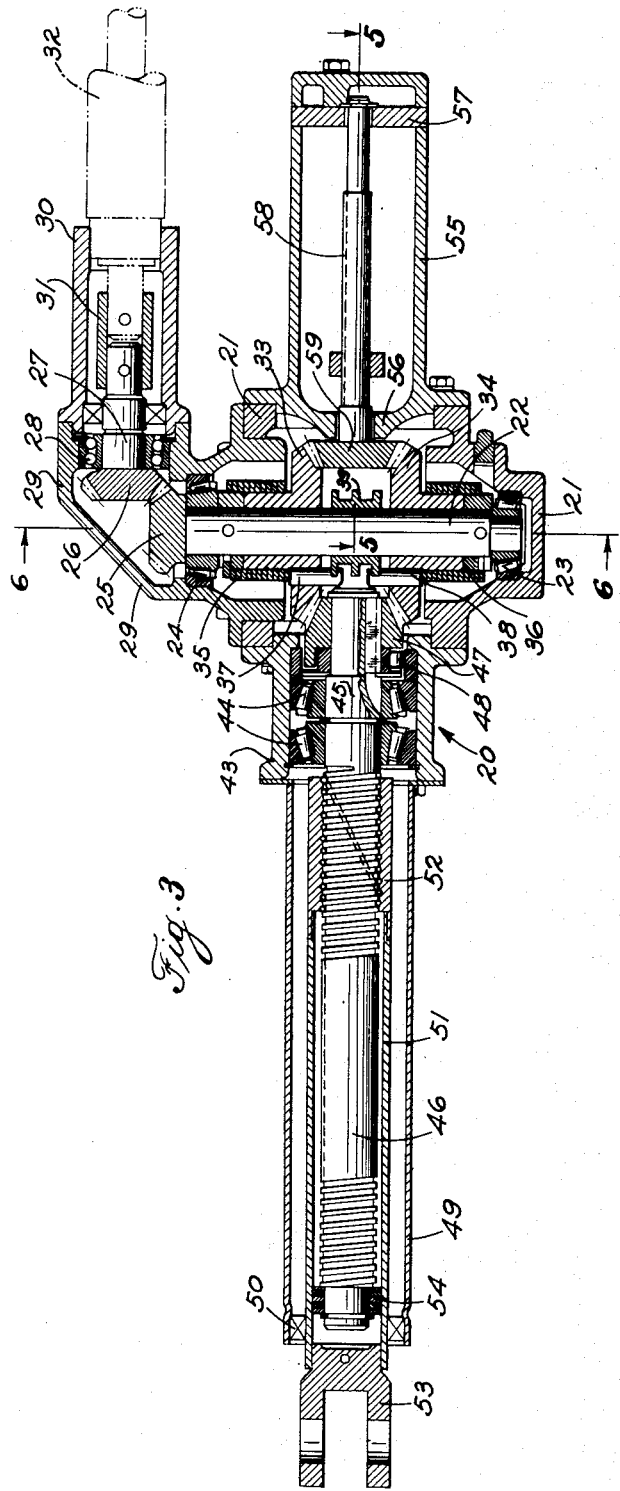
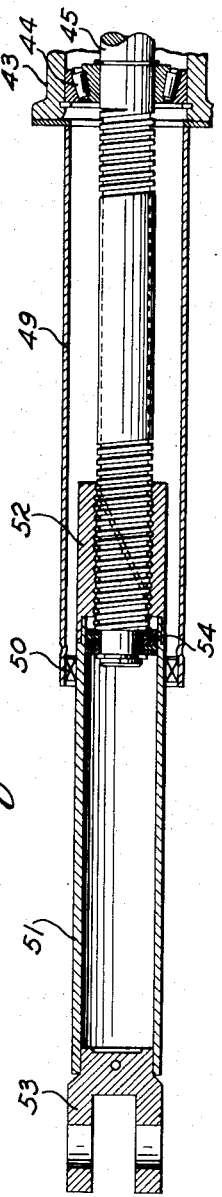
INVENTOR.
LOREN E. LURA
BY
ATTORNEY

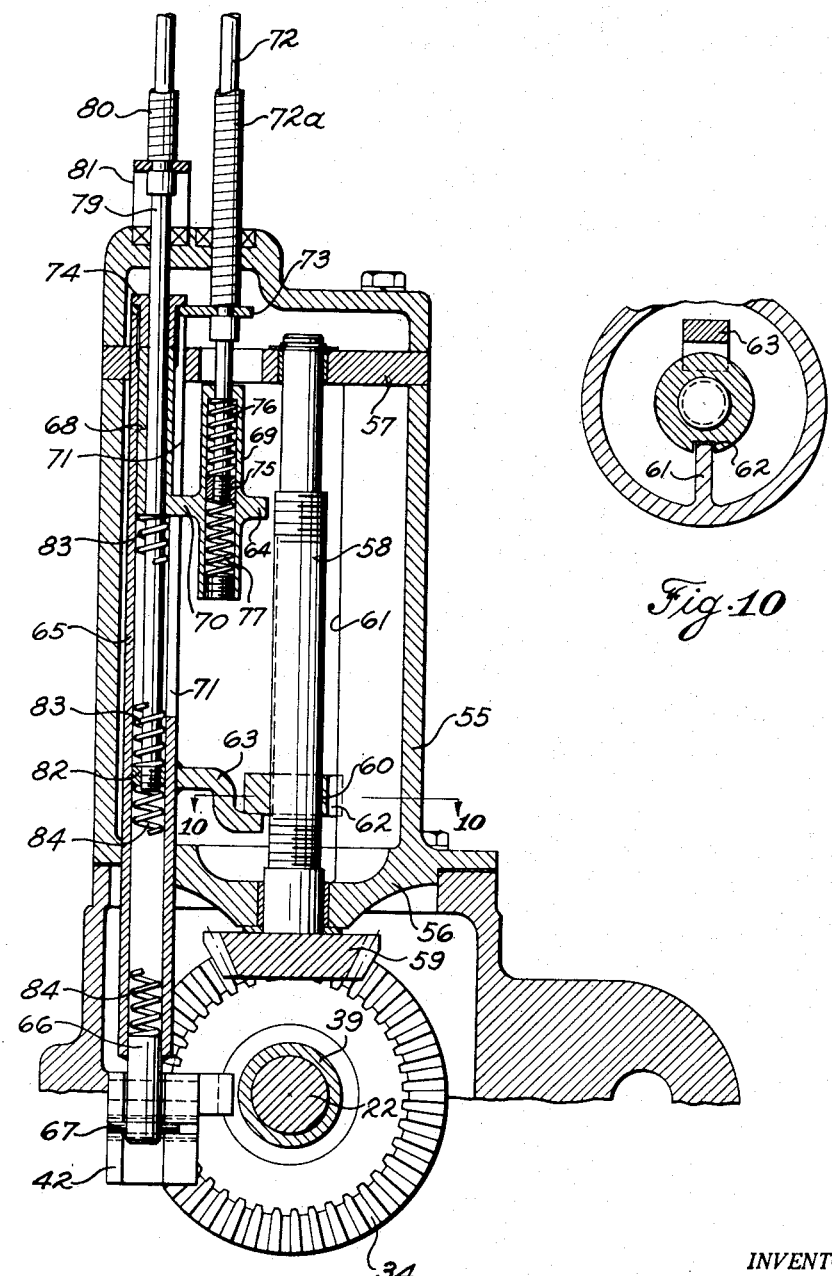

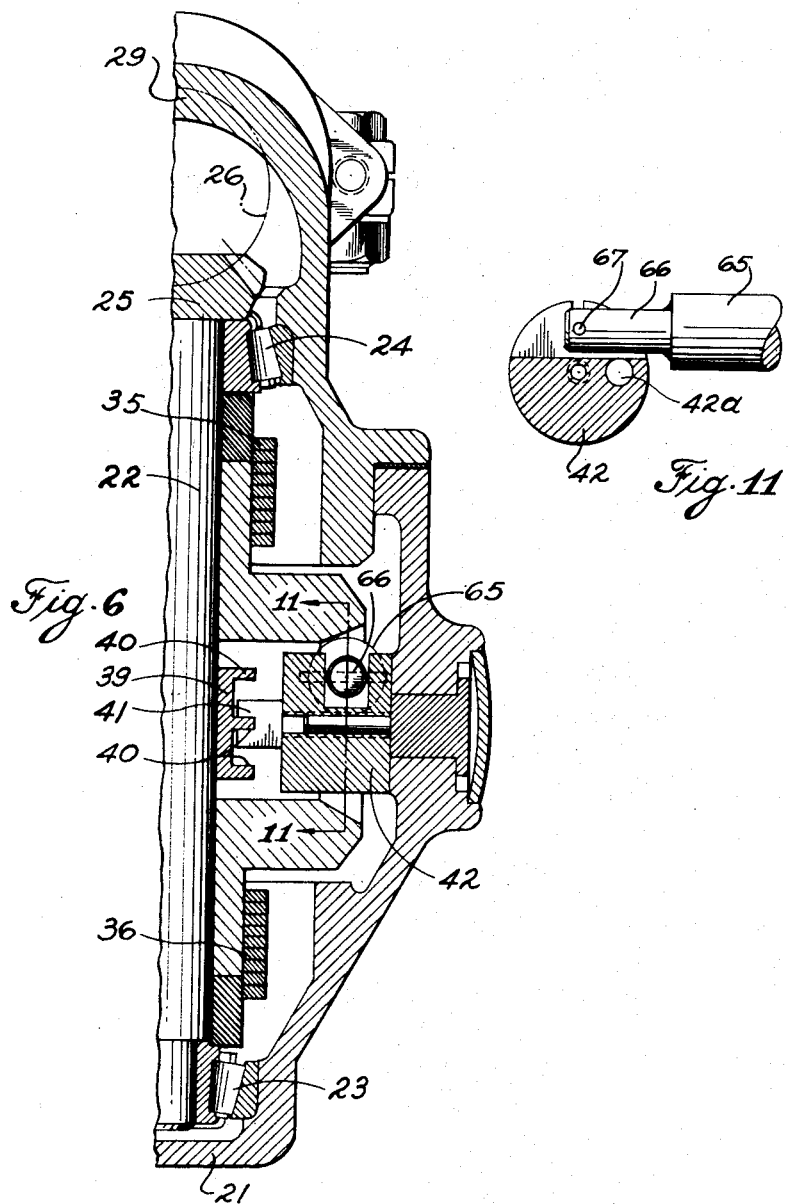

Aug. 11, 1953        L. E. LURA        2,648,229
POWER TRANSMITTING MECHANISM
Filed April 19, 1951        7 Sheets-Sheet 6
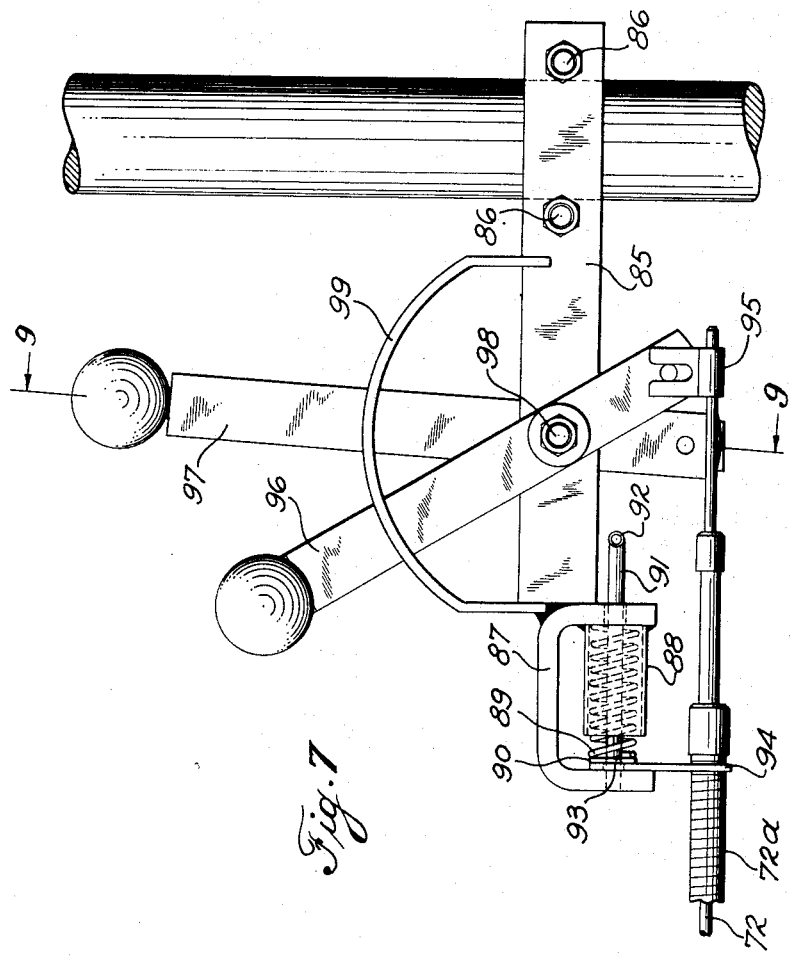
INVENTOR.
LOREN E. LURA
BY
ATTORNEY Aug. 11, 1953 L. E. LURA 2,648,229
POWER TRANSMITTING MECHANISM
Filed April 19, 1951 7 Sheets-Sheet 7
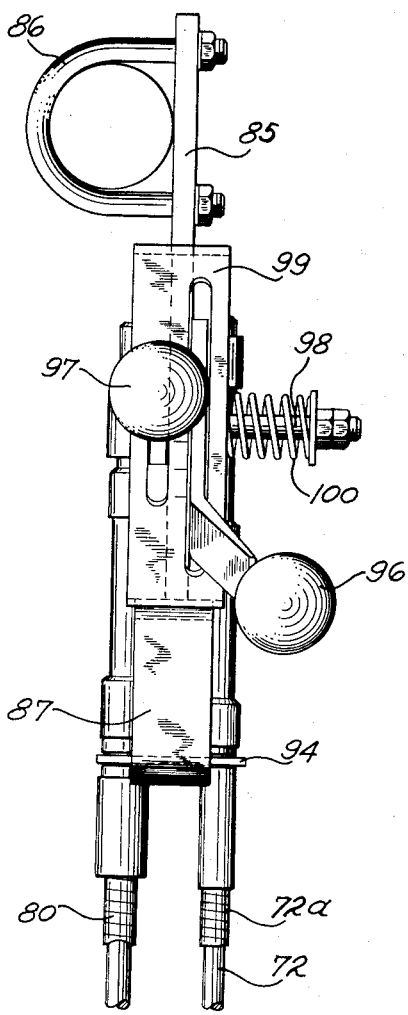
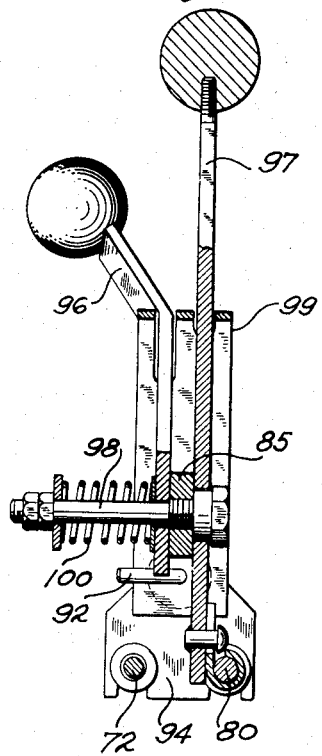
INVENTOR.
LOREN E. LURA
BY
ATTORNEY Patented Aug. 11, 1953

2,648,229

UNITED STATES PATENT OFFICE 2,648,229

POWER TRANSMITTING MECHANISM

Loren E. Lura, Chicago, Ill., assignor to The Cleveland Pneumatic Tool Company, Cleveland, Ohio, a corporation of Ohio Application April 19, 1951, Serial No. 221,881

11 Claims. (Cl. 74—378)

1

This invention relates to a mechanical device which can be used in conjunction with a powered vehicle, such as a tractor, to raise and lower pull type farm implements such as plows, disks and the like.

One object of this invention is to include in such mechanical device a ball bearing screw and nut assembly, through which lifting or pushing power can readily be transmitted to the implement from an available source of rotary power.

Another object of this invention is to provide such device with a simple and efficient two-way lock capable of maintaining the device and implement in any desired position after removal or disconnection of the actuating power.

Another object of this invention is to provide such device with adequate controls through which the device, when the implement has been raised or lowered to a predetermined position, is automatically cut off from its actuating or driving power.

Another object of this invention is to design such device to form a simple and inexpensive unit which can be either incorporated in the housing of the powered vehicle and driven directly from transmission gears, or incorporated as an attachment on the powered vehicle and driven from a convenient source of power such as the timing gears or power-take-off by means of either a rigid or flexible connection. The device can also be mounted as an attachment on the implement, driven and operated by remote control.

Another object of this invention is to produce remote controls for the device, when used as an attachment on the implement, which are secured to the powered vehicle in a manner enabling them to automatically break loose when the implement becomes disconnected from the powered vehicle.

Other objects and advantages of this invention will be apparent from the following detailed description wherein similar characters of reference designated corresponding parts, and wherein.

2

Figure 1:
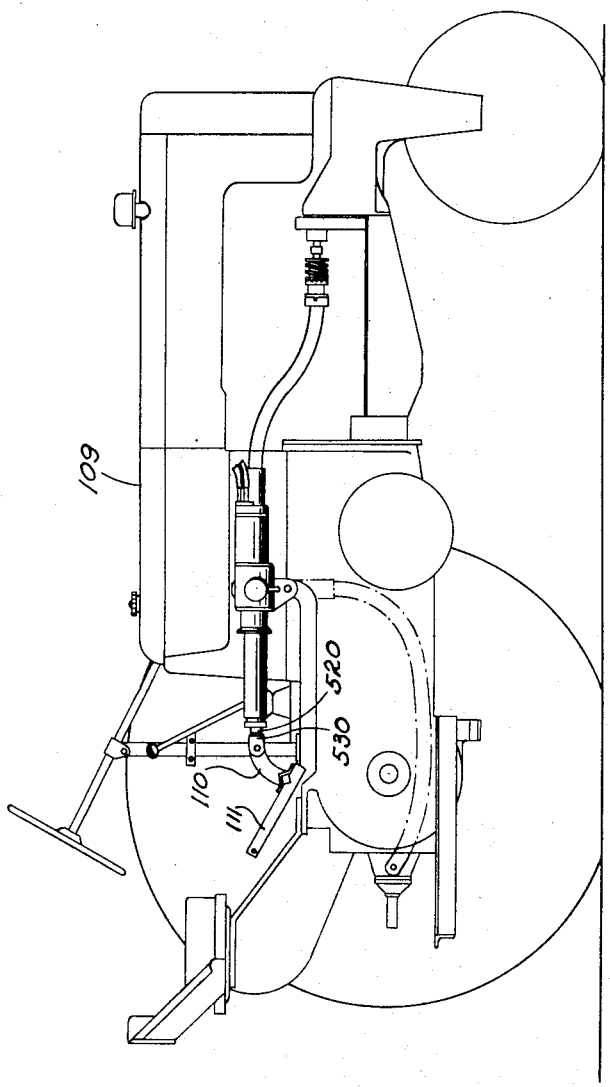
Figure 1 is a side elevational view of a tractor embodying the invention. In this instance, the device is shown as an attachment on the tractor.

Figure 3 is a longitudinal sectional view of the device shown with its ball bearing screw and nut assembly in a retracted position.

Figure 4 is a view corresponding to Figure 3, but showing only the ball bearing screw and nut assembly in extended position.

Figure 5 is an enlarged longitudinal sectional view taken substantially on line 5—5 in Figure 3, showing the trip control and screw travel adjustment.

Figure 6 is an enlarged cross sectional view taken substantially on line 6—6 in Figure 3, showing the shift mechanism for driving and reverse clutches.

Figure 7 is a side elevational view showing actuating levers for control cables and safety connection between the cables and tractor.

Figure 8 is a top plan view of the levers and cables shown in Figure 7.

Figure 9 is a cross sectional view taken substantially through line 9—9 in Figure 7 and looking in the direction of the arrows.

Figure 10 is a cross sectional view taken substantially through line 10—10 in Figure 5.

Figure 11 is a cross sectional view taken substantially through line 11—11 in Figure 6.

In the following specification, it is to be understood that "device" means the mechanical screw lift assembly shown in Figure 3 and about to be described; "implement" means any tool, farm implement or industrial machine, generally being pulled by a powered vehicle to perform a useful purpose; "tractor" means any powered vehicle such as trucks, tractors, road machinery and the like.

Referring now to the drawings, and more particularly to Figure 3, the device designated generally by 20 consists of a central housing 21 in which a main shaft 22 has its ends journalled in bearings 23 and 24. Above the bearing 24, shaft 22 is provided with a preferably integral bevel gear 25 meshing with a bevel gear 26, the latter being the end of a small arbor 27 journalled within a bearing 28, which bearing is mounted within a gear housing 29 adequately secured to the housing 21. Gear housing 29 extends laterally from shaft 22 to form a sleeve housing 30 in which the arbor 27 is connected by a resilient sleeve 31 to one end of a flexible drive shaft 32, which has its other end connected to a source of rotary power as well be explained later.

Mounted on the main shaft 22 for rotation relative thereto, are two opposite bevel gears 33 and 34, the bevel gear 33 being associated with a spring clutch 35 through which it may be drivenly connected to the shaft 22, while the gear 34 is associated with a spring clutch 36. Since the spring clutches are commercially purchased items and are well known in the trade, no further explanation is thought necessary other than pointing out that the clutch 35 is operable by a push pin 37 slidable through bevel gear 33 and the clutch 36 by a push pin 38 slidable through gear 34. Slidable on the main shaft 22 between the two gears 33 and 34, there is a collar 39 provided with three longitudinally spaced external annular ribs 40, Figure 6, the two extreme or end ones fitting in grooves or notches provided in the ends of the push pins 37 and 38, while the center rib fits in the groove of a collar actuator 41 which is mounted in a bell crank lever 42 pivotally mounted on an offset pin 42a. By rotating the bell crank, the collar is caused to slide on the shaft 22 forcing one of the push pins 37 or 38 in operating clutch position, resulting in transmission of rotation from the main shaft 22 to one of the gears 33 or 34, depending upon which clutch is engaged. Rotation of the bell crank is effected in a manner to be described later.

Extending laterally from the main housing 21, there is a substantially cylindrical screw housing 43 rigidly fastened to the housing 21 by any suitable means, and accommodating two bearings 44 in which is journalled the smooth inner end 45 of a screw 46. The screw end 45 extends through the bearings 44 and has keyed thereon a bevel gear pinion 47 in mesh with the bevel gears 33 and 34 for transmitting rotation from either gear, and therefore in either direction, to the screw 46. Between the pinion 47 and bearings 44, there is operatively associated with the screw end portion 45 a two-way locking brake 48 which automatically holds the screw 46 against rotation in either direction except when rotated or driven in either direction through the pinion 47. Since this locking brake is a commercially purchased item and is described in United States Patents No. 2,406,644 and 2,449,020, no further explanation is believed necessary. From the bearings 44, the screw 46 extends longitudinally in a tubular screw shield 49 secured by one of its ends to the screw housing 43, while the other end accommodates a sliding bearing 50 through which is free to slide the tubular extension 51 of a nut 52, the nut extension being terminated by a clevis 53. In order to facilitate movement of the nut on the screw, that is, to reduce friction and therefore require less power for a given load, the screw and nut assembly is of the anti-friction type wherein instead of regular screw threads, the two elements have complemental spiral grooves in which are inserted a plurality of balls which interconnect the nut and screw and transmit axial forces from one to the other. In practice, the anti-friction screw is preferably of the type wherein alternate large and small balls are located in the spiral grooves, the entire screw assembly being generally as described in United States Patent No. 2,298,011. On the extreme outer end of the screw, there is mounted a shock absorbing unit 54 capable of resilient contact with the nut to prevent further extension of the mechanism and with the clevis 53 to prevent further contraction.

The housing 21 has rigidly secured thereto a control housing 55 which extends laterally therefrom in substantially diametrically opposite relation with the screw housing 43. Control housing 55 has two cross walls 56 and 57 in which are journalled the end portions of a screw shaft 58. This shaft has rigidly mounted on its inner end a bevel gear pinion 59 in mesh with the bevel gears 33 and 34. With more particular reference to Figure 5, it will be seen that on the screw shaft 58 there is a nut 60 held against rotation by a rib 61 extending in the housing 55 alongside of the screw shaft 58 and fitting in a key-way 62. Thus, upon rotation of the screw shaft 58, the nut 60 moves longitudinally on the shaft for engagement with either of two stops 63 and 64 located in its path alongside of the shaft 58. The stop 63 is an integral part of a tube like member or shifting plunger 65 mounted in the housing 55 parallel to the screw shaft 58 and slidable through the end walls 56 and 57. As seen in Figure 5, the lower end of the tube 65 has a shank 66 welded thereto, which shank carries a cross pin 67 fitting in a clevis like portion of the bell crank lever 42. The stop 64 is an integral part of a relatively small housing having two parallel tubular sections 68 and 69 united by a bridge 70. The section 68 is slidably mounted within the upper portion of the tube like member 65, which member has a slot 71 provided through its wall to accommodate the bridge 70. In the other section 69 is located one end of the inner wire 72 of a control cable, which has its flexible housing 72a fixed to the upper end of the shifting plunger 65 by a cross plate 73 and nut 74. The wire 72 extends into the section 69 where it is provided with a head 75 resiliently connected to section 69 by two compression springs 76 and 77. Extending through the tubular section 68 of the stop 64 and into the shifting plunger 65, there is one end of the inner wire 79 of another control cable which has its flexible housing 80 fixed to the housing 55 by a bracket 81. In the plunger 65, the wire 79 is terminated by a head 82 resiliently connected to the plunger 65 by two compression springs 83 and 84.

The supporting means for the other ends of the control cables 72a and 80 together with their operating means form a self contained unit all carried by a single plate like bracket 85 which may be rigidly secured to the tractor by a clamp 86. The two cables are attached to the bracket 85 through a release safety device including a substantially U-shaped connector 87 preferably welded to the bracket 85. Between its legs, the connector is provided with a socket 88 secured to the right leg thereof and accommodating a compression spring 89 acting on the head 90 of a plunger 91, which plunger extends through the right leg of the connector where it is terminated by a handle 92. Coaxially with the plunger 91, there is a short pin 93 protruding from the left leg of the connector, which pin has loosely fitted thereon the apertured upper end of a plate 94. The two cables 72a and 80 extend through the lower end of the plate 94 where they are rigidly secured, while the inner wire of each cable extends therefrom a relatively short distance and is terminated by a slotted connector 95. The cables 72a and 80 are operable by hand control levers 96 and 97 respectively, which are pivotally mounted on a small cross shaft 98 carried by the bracket 85. The two levers are movable within a slotted guiding quadrant 99 also carried by the bracket 85, and are frictionally maintained in any desired positions by a compression spring 100 mounted on the shaft 98.

Figure 2:
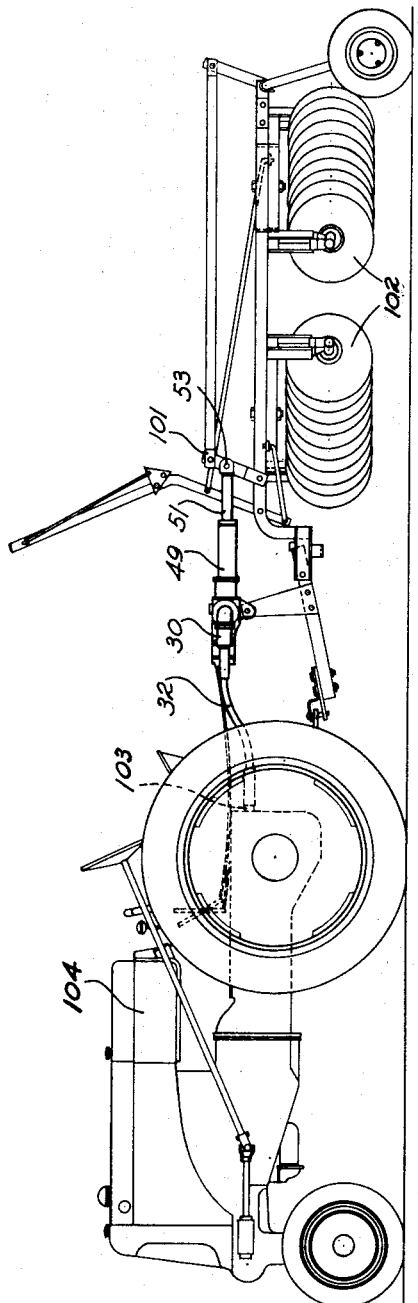
Figure 2 is a side elevational view of a tractor and implement with the device mounted as an attachment on the implement, driven from the tractor's power-take-off and equipped with remote controls operated from the tractor.

The operation of the device will be substantially the same irrespective of its use as part of a tractor or implement or as an attachment thereon. When it is used as shown in Figure 2, that is as an attachment on an implement, the clevis 53 is preferably connected to a system of levers 101 of the implement 102, through which extension and retraction of the pull and push mechanism consisting of the screw 46 and nut 52 will cause the implement to be raised and lowered respectively. In this instance, the flexible shaft 32 is preferably connected to the power-take-off 103 of the tractor 104, which may hereinafter be referred to as a prime mover, from where rotation is transmitted to the main or drive shaft 22 through the bevel gears 26 and 25. With the clutch control sliding collar 39 in neutral position, that is equally spaced from the bevel gears 33 and 34, the clutch actuator pins 37 and 38 and consequently the two clutches 35 and 36 will remain in neutral or inoperative position, thereby enabling the bevel gears 33 and 34 to remain stationary relative to the rotating drive shaft 22. This neutral position of the clutch control sliding collar 39 is obtained by the hand operated lever 97 positioned substantially as shown in Figure 7, that is, half way between the ends of its possible travel in the quadrant 99, causing the trip clutch control cable 80, operated by the lever 97, to position the bell crank 42 and actuator 41 in the neutral position of the collar 39. The clutch control collar is shifted in this neutral position when the implement, such as the disks 101 shown in Figure 2, has been raised or lowered to the desired position. During this neutral or inoperative position of the driving mechanism, the screw 46 or push and pull mechanism is automatically held against accidental rotation in either direction by the two-way brake lock 48 operatively associated with the inner end of the screw and the housing 43. Thus it will be understood that once raised or lowered to the desired position, the implement is automatically locked against further movement in either direction.

When it is desired to lower or raise the implement 102, the hand lever 97 may be moved in one of its extreme possible positions relative to the quadrant 99, thereby causing the trip clutch control cable 80, or more particularly its wire 79, through the head 82 and springs 83 and 84, to transmit sliding movement to the shifting plunger 65 in one or the other direction, resulting in the rotation of the bell crank 42 in one or the other direction to shift the clutch control sliding collar 39 in clutch operating position. If in Figure 3 the collar 39 is moved upwardly on the shaft 22, it will cause the push pin 37 to effect engagement of the spring clutch 35 and rotation of the bevel gear 33 while the bevel gear 34 remains idle. From the gear 33 rotation in one direction is transmitted to the screw 46 through the bevel gear 47. If, however, the collar 39 is moved downwardly on the shaft 22, it will cause the push pin 38 to effect engagement of the spring clutch 36 and rotation of the bevel gear 34 while the gear 33 remains idle. From the gear 34 rotation in the other direction is transmitted to the screw 46 through the bevel gear 47. It will be understood that by shifting the hand control lever 97 from its neutral to one or the other end of its possible travel, rotation in one or the other direction is imparted to the screw 46, causing the nut 52 to move longitudinally outwardly or inwardly on the screw, that is, causing extension or retraction of the pull and push mechanism. When the device is connected to the implement as shown in Figure 2, it will be seen that extension of the pull and push mechanism will cause the implement to be raised relative to the ground, while retraction of the mechanism will cause the implement to be lowered. When rotation in either direction is imparted to the screw 46 through the bevel gear 47, the two-way brake lock 48 is automatically released to enable such rotation, and automatically reset to prevent rotation of the screw when driving power through the gear 47 has been cut off.

Associated with the trip clutch control cable 80, there is a power control through which driving power of the screw 46 in either direction can automatically be cut off when the implement has reached a predetermined position. This control includes the spaced stops 63 and 64 between which the nut or actuator 60 travels on the screw shaft 58. With reference to Figure 5, it will be understood that rotation of either driving gears 33 or 34 is transmitted to the meshing bevel gear 59, causing the screw shaft 58 to rotate in one or the other direction and the nut 60 to move thereon until it contacts either stop 63 or 64. When it contacts the stop 63, it will cause the shifting plunger 65 to move downwardly and rotate the bell crank 42 for sliding the collar 39 on the drive shaft 22 away from the bevel gear 33 and into neutral position. This sliding movement of the collar will cause the pin 37 to disengage the clutch 35 and release the drive between the shaft 22 and gear 33, thereby preventing further travel of the push and pull mechanism. When the nut 60 contacts the stop 64, it will exert pressure thereon which is transmitted to its section 68 through the bridge 70 and therefrom to the shifting plunger 65 to move it upwardly and rotate the bell crank 42 for sliding the collar 39 on the shaft 22 away from the bevel gear 34 and into neutral position. This sliding movement of the collar will cause the pin 38 to disengage the clutch 36 and release the drive between the shaft 22 and gear 34, thereby preventing further travel of the push and pull mechanism.

In practice the stop 63, which is non-adjustable, controls the lift of the implement relative to the ground or work. Through it, the implement is always returned or lifted to the same inoperative position, which need not be varied. However, it is desirable that the extent to which the implement can be lowered be made adjustable. Since the length of travel of the stop nut 60 on the screw shaft 58 is determined by the distance between the stops 63 and 64, and the length of stroke of the ball bearing nut 52 on the screw 46 is determined by the length of travel of the stop nut, it will be understood that a change in the length of travel of the nut 60 will result in a proportional change in the stroke of the ball bearing nut 52. To that end, the position of the stop 64 relative to the screw shaft 58 may be changed at will by shifting the hand lever 96, causing the control cable 72a and its wire 72 to move the stop 64 closer to or further away from the stop 63, thereby controlling the extent to which the implement can be lowered.

As shown in Figures 7, 8 and 9, the control cables 72 and 80 can readily be disconnected from the tractor 104 by manually pulling the handle 92 to compress the spring 89 and cause the head 90 of the plunger 91 to move away from the stationary pin 93. Thereafter, the plate 94 carrying the two cables can be removed from the pin 93. Since the ends of the control cables are connected to the levers 96 and 97 through the slotted connections 95, once the plate 94 is removed from the U-shaped bracket 87, the ends of the cables will simply fall off the ends of the levers. As previously stated, this connection also provides a safety release through which the control cables, when subjected to an accidental pull such as resulting from the tractor 104 moving away from the implement 102, will automatically be disconnected from the bracket 85. In such instance, the cable pull will cause the lower end of the plate 94 to move toward the left and its upper end to tilt toward the right in Figure 7, thereby resulting in the apertured end of the plate to slip off the stationary pin 93 against the pressure of the plunger head 90. Once off the pin 93, the plate 94 and the two cables 72 and 80 will simply drop off the bracket 87.

When the device is used as part of a tractor such as 109 shown in Figure 1, the push and pull mechanism including the ball bearing nut 520, is connected by its clevis 530 to a system of levers 110 including a rearwardly extending link 111 to which the implement may be connected. Since in this instance the device corresponds to and operates in the same manner as above described, no further information is thought necessary.

Althrough the foregoing description is necessarily of a detailed character, in order to completely set forth the invention, it is to be understood that the specific terminology is not intended to be restrictive or confining and it is to be further understood that various rearrangement of parts and modification of structural detail may be resorted to without departing from the scope or spirit of the invention as herein claimed.

I claim:

1. A rotation transmitting mechanism between a driving shaft and driven element consisting of a system of gears capable of transmitting rotation from said shaft in one direction to said element in either direction, said system including two gears on said shaft meshing with a pinion operatively associated with said element, a spring clutch between each of said gears and shaft, clutch operating pins slidable through said gears, clutch control means including a collar slidable on said shaft between said gears and pins, said pins being responsive to the slidable movement of said collar to effect engagement of one clutch and release of the other, and a manually operable member through which slidable movement of said collar is effected.

2. A rotation transmitting mechanism between a driving shaft and driven element consisting of a system of gears capable of transmitting rotation from said shaft in one direction to said element in either direction, said system including two gears on said shaft meshing with a pinion operatively associated with said element, a spring clutch between each of said gears and shaft, clutch operating pins slidable through said gears, clutch control means including a clutch actuator acting on said pins to effect engagement of one clutch and release of the other, a manually operable member connected with said actuator through which clutch engagement and release movement of the latter may be effected, and means automatically effecting clutch release movement of said actuator under certain conditions of operation.

3. A power transmitting mechanism consisting of a prime mover having rotation imparted thereto, a driving shaft rotated by said prime mover, a driven element, a system of gears between said shaft and element capable of transmitting rotation from the former in one direction to the latter in either direction, said system including two gears on said shaft in mesh with a pinion drivingly connected to said element, a spring clutch between each of said gears and shaft, clutch operating means slidable through said gears, clutch control means including a clutch actuator acting on said pins to effect engagement of one clutch and release of the other, a manually operable member connected with said actuator through which clutch engagement and release movement of the latter may be effected, and stop means automatically effecting clutch release movement of said actuator to limit the extent of rotation of said element in either direction.

4. A power transmitting mechanism consisting of a prime mover having rotation imparted thereto, a driving shaft rotated by said prime mover, a driven element, a system of gears between said shaft and element capable of transmitting rotation from the former in one direction to the latter in either direction, said system including two gears on said shaft in mesh with a pinion drivingly connected to said element, a spring clutch between each of said gears and shaft, clutch operating pins slidable through said gears, clutch control means including a clutch actuator acting on said pins to effect engagement of one clutch and release of the other, remote controls including a flexible element for said actuator manually operable to effect its clutch engagement and release movement, and stop means operable by virtue of said gears rotation to automatically effect clutch release movement of said actuator when said element has been rotated a predetermined extent.

5. A rotation transmitting mechanism including a rotating shaft, a driven element, means including two clutches between said shaft and element capable of transmitting rotation from said shaft in one direction to said element in either direction, an actuator movable into a neutral position effecting release of said clutches, a screw rotated by said shaft in either direction subject to the action of said clutches, a nut longitudinally movable in both directions on said screw by virtue of its rotation, a pair of stops moved by said nut to limit longitudinal movement of the latter in either direction, and connecting means between said stops and actuator through which movement of either stop causes said actuator to be shifted and maintained into said neutral position.

6. A rotation transmitting mechanism including a rotating shaft, a driven element, means including two clutches between said shaft and element capable of transmitting rotation from said shaft in one direction to said element in either direction, a clutch actuator movable to effect engagement of one clutch and release of the other, said actuator being movable into a neutral position effecting release of said clutches, means connected to said actuator including a plunger manually operable to effect clutch engagement and release movement of said actuator, a screw rotated by said shaft in either direction subject to the action of said clutches, a nut longitudinally movable in both directions on said screw by virture of its rotation, a pair of stops moved by said nut to limit longitudinal movement of the latter in either direction, and connecting means between said stops and actuator including said plunger through which movement of either stop causes said actuator to be shifted and maintained into said neutral position.

7. A rotation mechanism as set forth in claim 6, in which at least one of said stops is adjustable to vary the extent of longitudinal movement of said nut on said screw.

8. A rotation transmitting mechanism including a rotating shaft, a driven element extending laterally from said shaft, a pair of bevel gears on said shaft meshing with a bevel pinion on said element through which rotation from said shaft in one direction may be transmitted to said element in either direction, a clutch actuator slidable on said shaft to effect engagement of one clutch and release of the other, said actuator being movable into a neutral position effecting release of said clutches, means connected to said actuator including a plunger manually operable to effect clutch engagement and release movement of said actuator, a screw extending laterally from said shaft, a pinion on said screw in mesh with the bevel gears on said shaft through which said screw may be rotated in either direction subject to the action of said clutches, a nut longitudinally movable in both directions on said screw by virtue of its rotation, a pair of stops acted upon by said nut near the ends of its travel on said screw, and connecting means between said stop and actuator including said plunger through which action of said nut on said stops causes said actuator to be shifted and maintained into said neutral position.

9. In a mechanical device of the character described, the combination of a housing, a tubular screw shield extending laterally from said housing, a screw in said shield journalled in said housing, a nut on said screw having a tube member slidable through one end of said shield and terminated by a connection through which it may be secured to the work intended to be pushed or pulled upon extension or retraction of said tube member relative to said shield, a prime mover in said housing, a shaft drivenly connected to said prime mover, a system of gears and a pair of clutches in said housing capable of transmitting rotation from said shaft in one direction to said screw in either direction to effect said extension or retraction of said tube member, remote control means including a flexible element leading from said housing manually operable to effect engagement of one or the other of said clutches and govern the direction of rotation of said screw, adjustable stop means operatively associated with said system automatically releasing at least one of said clutches upon a predetermined extent of rotation of said screw in one direction, and remote control means including a flexible element leading from said housing manually operable to effect adjustment of said stop means.

10. A rotation transmitting mechanism including a rotating shaft, a driven element, a pair of gears on said shaft in mesh with a pinion on said element, a clutch between each of said gears and shaft, clutch control means including a clutch actuator movable to effect engagement of one clutch and release of the other, said actuator being movable into a neutral position effecting release of said clutches, a screw rotated by said shaft subject to the action of said clutches, a nut longitudinally movable on said screw by virture of its rotation, a stop movable by said nut, connecting means between said stop and actuator through which movement of said stop effects movement of said actuator into said neutral position, and manually operated means to effect subsequent clutch engagement movement of said actuator.

11. In a mechanical device of the character described, the combination of cooperating screw and nut elements, a tubular shield surrounding said screw element, a tubular extension for said nut element extending therefrom through one end of said shield, a two-way locking brake operatively associated with said screw element automatically preventing its rotation by forces exerted from said nut element, a rotation transmitting mechanism for said screw element including a prime mover, a shaft drivenly connected to said prime mover, a pair of gears on said shaft in mesh with a pinion on said screw element, a clutch between each of said gears and shaft, clutch control means including a clutch actuator movable to effect engagement of one clutch and release of the other, said actuator being movable into neutral position effecting release of said clutches, manually operable means to effect clutch engagement and release movement of said actuator, and means deriving motion from said shaft upon engagement of one of said clutches to automatically shift said actuator into said neutral position upon a predetermined extent of rotation of said screw element.

LOREN E. LURA.

References Cited in the file of this patent

UNITED STATES PATENTS

| Number | Name | Date |
|---|---|---|
| 1,037,921 | Jensen | Sept. 10, 1912 |
| 1,312,091 | Arter | Aug. 5, 1919 |
| 1,476,886 | Hanbert | Dec. 11, 1923 |
| 1,819,306 | Starkey et al. | Aug. 18, 1931 |
| 2,283,476 | Waibel | May 19, 1942 |
| 2,375,970 | Williams | May 15, 1945 |
| 2,440,550 | Martin | Apr. 27, 1948 |
| 2,441,505 | Ochtman | May 11, 1948 |
| 2,508,046 | Smith | May 16, 1950 |

FOREIGN PATENTS

| Number | Country | Date |
|---|---|---|
| 7,539 | Great Britain | of 1894 |